Feb. 2, 1965   E. H. OLOFSSON ETAL   3,168,691
TRANSISTORIZED SERVO AMPLIFIER
Filed Nov. 23, 1962   2 Sheets-Sheet 1

Inventors
Erik Herbert Olofsson
Lars-Eric Jansson
By Cushman, Darby & Cushman
Attorneys 3,168,691
TRANSISTORIZED SERVO AMPLIFIER
Erik Herbert Olofsson, Johanneshov, and Lars Eric Jansson, Bandhagen, Sweden, assignors to Regulator A.G., Glarus, Switzerland, a company of Switzerland
Filed Nov. 23, 1962, Ser. No. 239,566
Claims priority, application Switzerland, Nov. 23, 1961, 11,660/61
8 Claims. (Cl. 318—207)

The present invention relates to a transistorized servo amplifier, wherein a two-phase load, preferably a reversible motor, is supplied with current from a transformer under the control of the phase position of input impulses supplied to the amplifier.

The object of the invention is to create an amplifier of said kind, which is less current-consuming and requires a smaller number of long conduits for connecting the load than known amplifiers.

Figure 1:
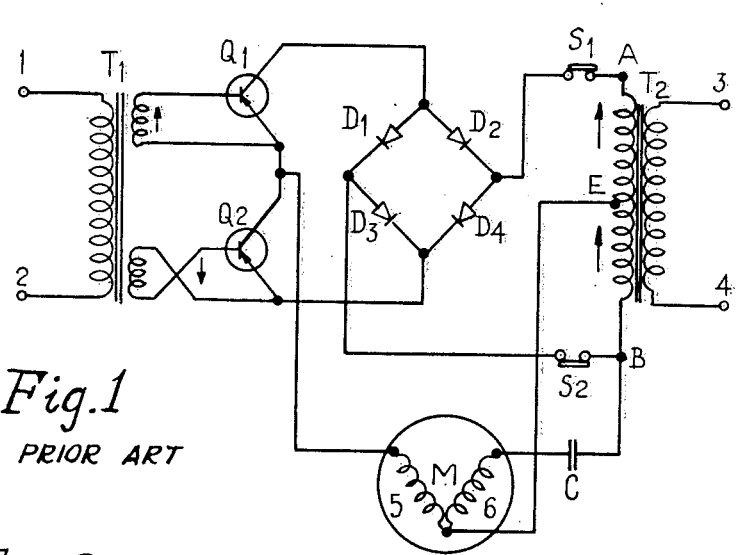
Figure 2:
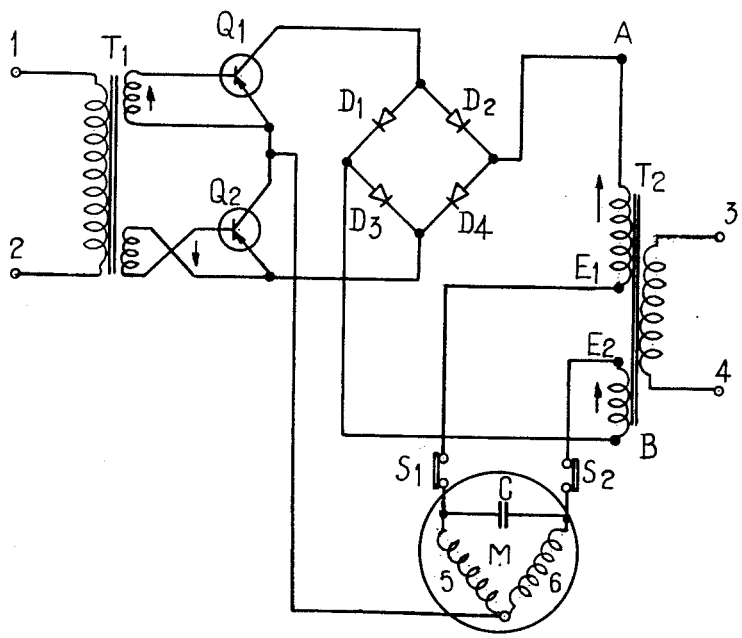
Figure 3:
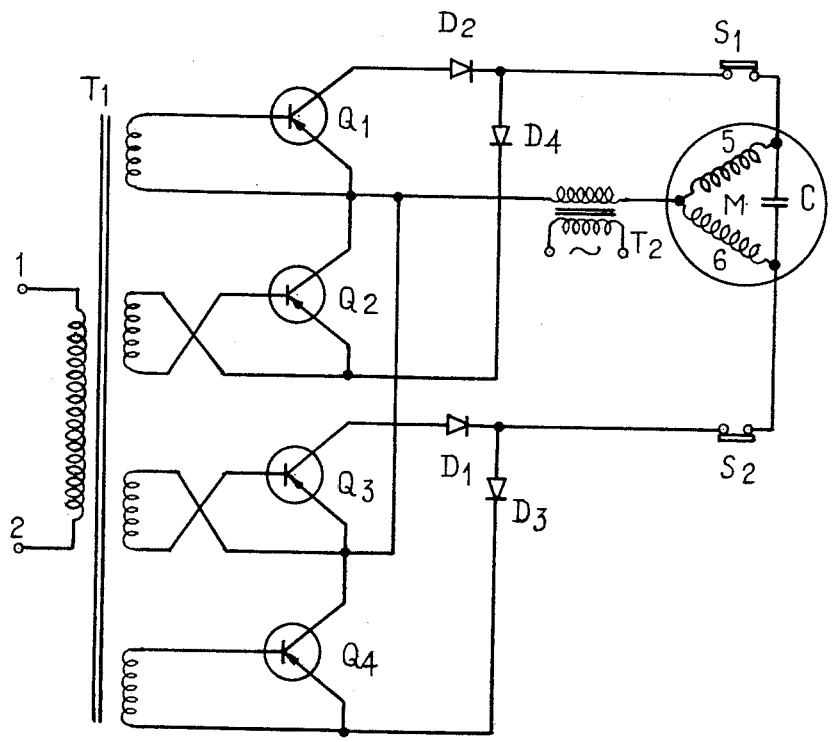

The invention will be more closely described hereinbelow with reference to the accompanying drawings, in which FIG. 1 is an earlier known circuit arrangement of the above-mentioned kind, FIG. 2 shows the circuit arrangement according to the invention, and FIG. 3 shows a modification thereof.

The known circuit arrangement of FIG. 1 comprises an input transformer $T_1$ having a primary winding connected to input terminals 1 and 2 and two secondary windings connected to the base and emitter electrodes of two transistors $Q_1$ and $Q_2$ in such a manner as to feed them in opposition to each other. A bridge circuit having four branches each comprising a diode rectifier $D_1$, $D_2$, $D_3$ and $D_4$, has the terminals of one diagonal connected to the collector of one $Q_1$ of the transistors and to the emitter of the other one $Q_2$ and the terminals of the other diagonal connected to the ends A and B of the secondary winding of a current supply transformer $T_2$, the primary winding of which is connected at terminals 3 and 4 to an alternating current supply of a suitable voltage. Between the bridge and the supply transformer there are inserted two limit switches $S_1$ and $S_2$. M designates a two-phase reversible alternating current motor having stator windings 5 and 6. The rotor of said motor is connected to a valve spindle or other driven member, the position of which should be controlled by impulses emanating from feeling means and supplied to the input terminals 1 and 2. The limit switches $S_1$ and $S_2$ are operated by said driven member in such a manner that the motor current is interrupted when said member reaches any of its limit positions. The motor winding 6 in series with a condenser C is connected at the points E and B to one half of the secondary winding of the transformer $T_2$. One end of the other motor winding 55 is connected to the first-mentioned winding 6 and to the centre tap E of the transformer $T_2$, and the other end of said motor winding 5 is connected to the lead connecting the emitter of the transistor $Q_1$ to the collector of the transistor $Q_2$.

The operation of the above-described circuit is as follows: Assume that the controlling impulses applied on the input terminals 1 and 2 consist of an alternating current of the same frequency as that of the network supplying the transformer $T_2$, and of a phase that can be shifted so as to be either the same as or the opposite to the phase applied to the transformer $T_2$. Then in a certain half-cycle the condition prevails that is indicated by the arrows of FIG. 1, the transistor $Q_1$ being non-conductive and the transistor $Q_2$ conductive. Current flows from the point A on the transformer $T_2$ through the diode rectifier $D_4$ and the transistor $Q_2$ to the motor winding 5 and back to the centre-tap E of the transformer $T_2$. At the same time any other circuit fed by the transformer winding A–E cannot be closed, because the direction of conductivity of the diode rectifier $D_2$ is adverse to current flow therethrough. The other transformer winding half B–E is steadily connected to the motor winding 6. No current can flow through said transformer winding and the motor winding 5 because the transistor $Q_1$ is non-conductive and the diode $D_3$ has an adverse direction of conductivity.

In the next half-cycle, all arrows are oppositely directed to the directions shown, and the transistor $Q_1$ is conductive and the transistor $Q_2$ non-conductive. The motor winding 5 is still supplied with current from the transformer winding A–E, but now through transistor $Q_1$ and diode $D_2$. Transistor $Q_2$ and diode $D_1$ prevent flow of current from said last-mentioned transformer winding B–E to said motor winding 5.

Thus the motor winding 5 is supplied with a full-wave current from the transformer winding A–E, whereas the motor winding 6 is supplied by a full-wave current from the transformer winding B–E; the latter current being phase-displaced relatively to the first-mentioned. On account of said motor windings being mutually displaced, a rotary magnetic field is produced, whereby the motor is driven in a certain direction of rotation, say clockwise.

When the phase of the controlling alternating current impulses applied on the input terminals 1, 2 is reversed relatively to the above, the transformer winding B–E will supply a full-wave current to the motor winding 5, whereas the transformer winding A–E is cut off therefrom. Due to the 180° phase shift of the current through the motor winding 5, the motor now rotates in the opposite direction, i.e. counterclockwise.

The above-described wiring of the amplifier has the disadvantage that the limit switches $S_1$ and $S_2$ for interrupting the motor current when the member driven by the motor has reached any of its desired end positions, are located closely to the transformer $T_2$, so that further four conduits, in addition to the three conduits connecting the motor windings, must be provided when said limit switches are placed in the neighborhood of the motor unit, as usually is desired. A further disadvantage of the above-described known arrangement consists therein that current is always flowing through the motor winding 6, i.e. not only when the motor is running for performing an adjustment of the member driven thereby but also when the control system is balanced and at rest. This involves undesired heating of the motor and surroundings and requires an unnecessarily large transformer.

These disadvantages are eliminated in the amplifier according to the invention, of which an embodiment is shown in FIG. 2.

In FIG. 2 the same reference designations have been applied to the various components as to their respective counterparts in FIG. 1. The main difference consists in the connection of the motor windings 5 and 6 to the current supply transformer $T_2$ and to the rectifier bridge. According to the invention the two secondary windings of said transformer are separated and the centre-tap E in FIG. 1 is replaced by two separate terminals $E_1$ and $E_2$. The connected ends of the motor windings 5 and 6 are connected in common to the lead connecting the emitter of transistor $Q_1$ to the collector of transistor $Q_2$. The other end of the motor winding 5 is connected at terminal $E_1$ to one secondary winding of the transformer $T_2$ and the other end of the motor winding 6 is connected at terminal $E_2$ to the other secondary winding of said transformer. The condenser C is connected between said last-mentioned ends of the motor windings. The limit switches $S_1$ and $S_2$ are inserted in series with their respective motor windings 5 and 6, respectively, and are located close to the motor M or within the same, so that merely three wires need be extended to the motor unit.

The operation of the circuit of FIG. 2 is similar to that of FIG. 1, the transistors, the rectifier bridge branches and the transformer windings (with the exception of the winding $E_2$–B) carrying current in the same instances as in FIG. 1. Thus when the voltages applied to the various transformer secondaries are directed as indicated by the arrows, the transformer winding A–$E_1$ feeds the motor winding 5 with current flowing in a circuit closed over $D_4$ and $Q_2$. Quite as in FIG. 1, the non-conductive transistor $Q_1$ and the reverse rectifier $D_3$ prevent flow of current in the circuit connected to the other secondary winding B–$E_2$, and therefore the motor winding 6 receives no current from said secondary winding. Due to the connection by means of the condenser C to the other motor winding 5, the winding 6 is fed from the same transformer winding A–$E_1$ as the former, but the current in the winding 6 is leading in phase relatively to the current flowing in the winding 5. In the next half-cycle when all arrows are reversed, the motor winding 5 will still be fed from its pertaining secondary winding A–$E_1$, now in a circuit passing over transistor $Q_1$ and rectifier $D_2$, whereas $Q_2$ and $D_1$ prevent the feeding of the motor winding 6 by its connected secondary winding B–$E_2$, so that the motor winding 6 still carries a current that is leading in phase less than 90 degrees relatively to the current through the motor winding 5, due to its connection thereto via the condenser C. Said phase difference causes the motor to rotate in the clockwise direction.

When the phase of the input is reversed in comparison to above, i.e. the arrows merely on the transformer $T_1$ are directed oppositely to the directions shown in FIG. 2, the transistor $Q_1$ is conductive and the transistor $Q_2$ non-conductive. Current now flows from transformer winding terminal $E_2$ through the motor winding 6, transistor $Q_1$, rectifier $D_1$ and back to transformer terminal B. The transformer winding A–$E_1$ cannot feed its connected motor winding 5 due to blockage at $D_2$ and $Q_2$, but the winding 5 carries a current derived from the winding B–$E_2$ due to its connection to the other motor winding 6, and said current is leading in phase in relation to the current in the winding 6. The same applies to the next half-cycle. Therefore, full-wave currents flow through the motor windings, but their mutual phase relation is now reversed, so that motor rotates in the opposite direction, i.e. counter-clockwise.

When no impulses are applied to the input terminals 1, 2, the two transistors $Q_1$, $Q_2$ are non-conductive and none of the transformer windings A–$E_1$ and B–$E_2$ supply current to the motor windings 5 and 6, the same being shut off simultaneously and the motor being at rest.

In the modification shown in FIG. 3, the current supply transformer $T_2$ is provided merely with a single secondary winding. Instead there are four transistors $Q_1$, $Q_2$, $Q_3$ and $Q_4$ which are grouped in two pairs and which are connected with their emitter and base electrodes each to a separate one of four secondary windings on the input transformer $T_1$ and in such a manner that the two transistors of the same group are fed in opposition to each other. Each transistor $Q_1$, $Q_2$, $Q_3$ or $Q_4$ is connected in series with a diode rectifier $D_2$, $D_4$, $D_1$ or $D_3$, respectively, and the direction of conductivity of each of said rectifiers corresponds to the conductive direction of the connected transistor. The lead connecting the emitter of the first transistor $Q_1$ to the collector of the second transistor $Q_2$ is connected not only to the lead connecting the emitter of the third transistor $Q_3$ to the collector of the fourth transistor $Q_4$ but also to one end of the secondary winding of the current supply transformer $T_2$. One end of the motor windings 5 and 6 are connected together and to the other end of said transformer winding. The other end of the motor winding 5 is connected to two parallel branches, one consisting of rectifier $D_2$ in series with transistor $Q_1$ and the other consisting of rectifier $D_4$ in series with transistor $Q_2$. Similarly the other end of motor winding 6 is connected to two parallel branches, one consisting of rectifier $D_1$ and transistor $Q_3$ and the other consisting of rectifier $D_3$ and transistor $Q_4$. The condenser C and the limit switches $S_1$ and $S_2$ are connected as in FIG. 2. The operation is of the circuit arrangement just described is closely similar to that of FIG. 2. The advantage of the former compared with that of FIG. 2 consists therein that a simpler current supply transformer can be used which involves a reduction of the price of the complete arrangement and more than compensates the increased number of transistors required.

The above-described embodiments of the invention are to be regarded merely as examples, and within the scope of the following claims, modifications in various respects are possible. One such modification resides therein that the load consists of stator windings on two separate one-phase motors adapted for driving a common shaft in mutually opposite directions. The rotors of said motors may be attached to the same shaft, or the motor shafts may be connected by means of gears to a common shaft on which the member that should be driven is fastened.

We claim:

1. Transistorized servo amplifier comprising: an input transformer, two secondary windings on said transformer, a first transistor and a second transistor, a lead connecting the collector of said first transistor to the emitter of said second transistor, said windings being connected each to the base and the emitter of a separate one of said transistors in such a manner as to feed them in opposition, a bridge circuit having four branches, a rectifier inserted in each of said branches, the terminals of a first diagonal of said bridge being connected to the emitter of the first transistor and to the collector of the second transistor, respectively, the rectifiers having their directions of conductivity coinciding with the directions of conductivity of the transistors, a current supply transformer, two secondary windings on said transformer, a load comprising two windings, said load windings being at their one ends connected together and to said lead connecting the transistors, said load windings being each in series with a separate one of said last-mentioned secondary windings connected to opposite terminals of a second diagonal of said rectifier bridge.

2. Amplifier as claimed in claim 1, in which said load windings are the stator windings of a reversible two-phase alternating current motor and in which a condenser is connected between the terminals of said windings, so that any motor winding when not fed by its pertaining secondary winding of the supply transformer, draws a phase-displaced current from the secondary winding directly connected to the other motor winding.

3. Amplifier as claimed in claim 1, in which the load windings are the stator windings of two separate one-phase motors adapted for driving a common shaft in mutually opposite directions.

4. Amplifier as claimed in claim 1, further comprising two normally closed switches each connected in series with a separate one of the load windings and adapted to be opened by a member moved by said load windings, in order to limit the motion of said member.

5. Amplifier as claimed in claim 2, further comprising two normally closed switches each connected in series with a separate one of said motor windings and adapted to be opened by a member driven by said motor so as to stop the motor when said member has been moved by the motor to a desired limit position.

6. Amplifier comprising: an input transformer, four secondary windings on said transformer, four transistors, a lead connecting the emitter of the first transistor to the collector of the second transistor, a lead connecting the emitter of the third transistor to the collector of the fourth transistor, said windings being connected each to the base and the emitter of a separate one of said transistors and in such a manner as to feed the first transistor in opposition to the second transistor and the third transistor in opposition to the fourth transistor, four rectifiers each connected in series with a separate transistor and having its direction of conductivity coinciding with the direction of conductivity of the transistor, a current supply transformer, a single secondary winding on said transformer, one end of said winding being connected to said two leads, a reversible electric motor, two stator windings on said motor, said windings being at their one ends connected together and to the other end of said single secondary winding, the first of said motor windings being at its other end connected in parallel to the first transistor in series with its pertaining rectifier and to the second transistor in series with its pertaining rectifier, and the second of said motor windings being at its other end connected in parallel to the third transistor in series with its pertaining rectifier and to the fourth transistor in series with its pertaining rectifier, and a condenser being connected between the said other ends of the motor windings.

7. Amplifier as claimed in claim 6, further comprising a normally closed limiting switch connected in series with either of said motor windings.

8. Transistorized servo amplifier comprising: an input transformer, at least two secondary windings on said transformer, at least one transistor group, each group including a pair of transistors, a lead connecting the collector of one transistor of each group to the emitter of the other transistor of said group, said windings being connected each to the base and the emitter of separate ones of said transistors whereby the transistors of each group are fed in opposition; rectifier means associated with each transistor group, said rectifier means comprising a bridge circuit one diagonal of which extends between the emitter of one transistor and the collector of the other transistor of each group, the rectifier means having a direction of conductivity coinciding with the directions of conductivity of the transistors; a current supply transformer having at least one secondary winding, a load comprising two windings, means for connecting said current supply transformer secondary winding to said load windings, said load windings being at their one ends connected together and to said lead connecting the transistors of each group, said load windings being connected in series with their other ends connected through separate limit switches to opposite ends of the other bridge diagonal.

References Cited by the Examiner
UNITED STATES PATENTS 2,956,222 10/60 Hill et al. ---------- 318—207.56
3,083,327 3/63 Byloff -------------- 318—257 X
3,109,971 11/63 Welch -------------- 318—207.51

JOHN F. COUCH, *Primary Examiner.*